(12) United States Patent
Nishioka et al.

(10) Patent No.: US 8,837,955 B2
(45) Date of Patent: Sep. 16, 2014

(54) PHASE MODULATION APPARATUS, TRANSMITTING APPARATUS, RECEIVING APPARATUS, AND PHASE MODULATION METHOD

(75) Inventors: Tsuyoshi Nishioka, Tokyo (JP); Hirokazu Ishizuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 754 days.

(21) Appl. No.: 13/120,082

(22) PCT Filed: Sep. 22, 2008

(86) PCT No.: PCT/JP2008/067086
§ 371 (c)(1),
(2), (4) Date: Jun. 7, 2011

(87) PCT Pub. No.: WO2010/032326
PCT Pub. Date: Mar. 25, 2010

(65) Prior Publication Data
US 2011/0229146 A1    Sep. 22, 2011

(51) Int. Cl.
*H04B 10/04*    (2006.01)
*H04L 9/08*     (2006.01)
*H04B 10/548*   (2013.01)
*G02F 1/01*     (2006.01)

(52) U.S. Cl.
CPC ............ *G02F 1/0121* (2013.01); *H04L 9/0858* (2013.01); *H04B 10/548* (2013.01)
USPC ............................ 398/188; 398/190; 398/191

(58) Field of Classification Search
USPC .................. 398/140, 154, 183, 208, 188–191
See application file for complete search history.

(56) References Cited

U.S. PATENT DOCUMENTS 5,074,631 A * 12/1991 Hamano et al. ................ 385/3
2006/0067601 A1    3/2006 Tateishi
(Continued)

FOREIGN PATENT DOCUMENTS

JP         2 239223        9/1990
JP       2006 126796       5/2006
(Continued)

OTHER PUBLICATIONS

Nishioka, T. et al., "Single-Photon Interference Experiment Over 80 Km With a Pulse-Driven Heralded Single-Photon Source", IEEE Photonics Technology Letters, vol. 20, No. 5, pp. 354-356. (Mar. 1, 2008).

(Continued)

*Primary Examiner* — Dzung Tran
(74) *Attorney, Agent, or Firm* — Oblon, Spivak, McClelland, Maier & Neustadt, L.L.P.

(57) ABSTRACT

It is aimed to provide a phase modulation apparatus that realizes high-precision phase modulation in high-speed phase modulation of dual optical pulses. A phase modulator 105 included in the phase modulation apparatus, when a dual optical pulse with a time difference composed of a signal optical pulse SP and a reference optical pulse RP passes therethrough, phase-modulates this dual optical pulse in proportion to an applied voltage of an electrical pulse. As a result, a phase-modulated SP' and a phase-modulated RP' are output. A modulation signal generator 106 outputs an electrical pulse of a predetermined bias at an input timing of a trigger signal, according to an input of a four-valued data signal, for example. The modulation signal generator 106 outputs, for one input of the trigger signal, a dual electrical pulse having a time difference and having opposite polarities. The time difference of this dual electrical pulse corresponds to the time difference of the dual optical pulse that passes through the phase modulator 105.

28 Claims, 11 Drawing Sheets

(56) References Cited

U.S. PATENT DOCUMENTS

2007/0248229 A1* 10/2007 Kawamoto et al. ........... 380/256
2008/0267635 A1* 10/2008 Kawamoto et al. ........... 398/141
2009/0268901 A1* 10/2009 Lodewyck et al. ............. 380/41

FOREIGN PATENT DOCUMENTS

JP          2007 155931          6/2007
JP          2007 251678          9/2007

OTHER PUBLICATIONS

Inoue, K. et al., "Differential Phase Shift Quantum Key Distribution", Physical Review Leters, vol. 89, No. 3, pp. 037902-1-037902-3, (Jul. 15, 2002).

International Search Report issued Jan. 6, 2009, in PCT/JP08/067086 filed Sep. 22, 2008.

* cited by examiner

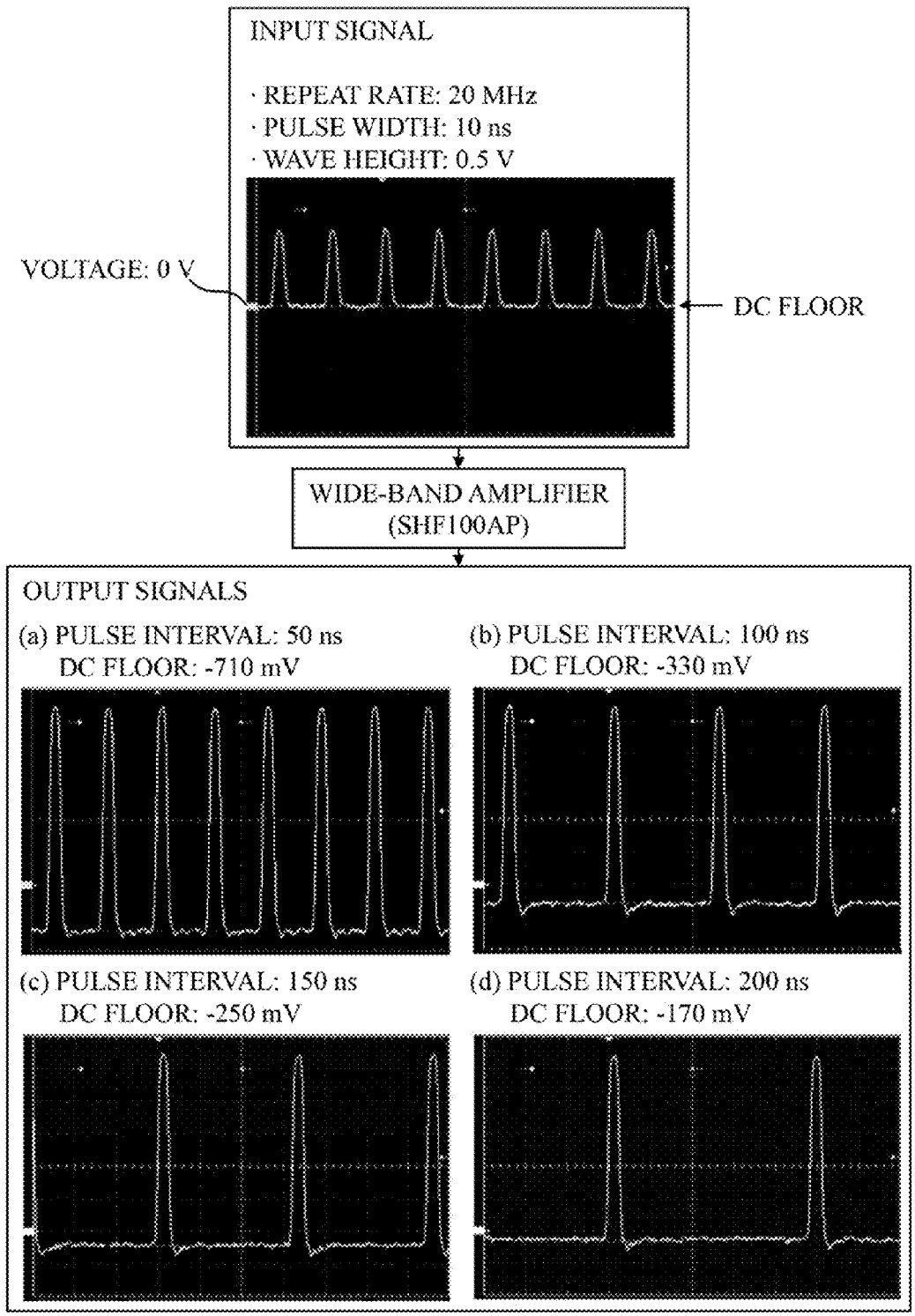

PHASE MODULATION APPARATUS, TRANSMITTING APPARATUS, RECEIVING APPARATUS, AND PHASE MODULATION METHOD

TECHNICAL FIELD

The present invention relates to a phase modulation apparatus, a transmitting apparatus, a receiving apparatus, and a phase modulation method. The present invention relates particularly to a high-speed phase modulation apparatus.

BACKGROUND ART

Conventionally, there has been a phase modulation method in which information is superimposed on the phase difference between two optical pulses with a time difference, namely a signal optical pulse and a reference optical pulse. A phase modulation apparatus employing this phase modulation method has been used for quantum cryptography communication. When an electrical pulse is applied to an optical pulse input to a phase modulator provided in the phase modulation apparatus, the optical pulse is phase-modulated (see FIG. 9).

In the above conventional phase modulation apparatus, as can be seen in the configuration of the transmitting side apparatus in Patent Literature 1, an electrical pulse for phase modulation is applied only to a signal optical pulse, and a reference optical pulse passes through the phase modulator without being phase-modulated (see FIG. 10). Alternatively, as can be seen in the configuration of the receiving side apparatus in Patent Literature 1, a signal optical pulse passes through the phase modulator without being phase-modulated and an electrical pulse for phase modulation is applied only to a reference optical pulse.

Patent Literature 1: JP 2007-251678 A

DISCLOSURE OF INVENTION

Technical Problem

The following problem arises in a configuration in which an electrical pulse is applied to only either of a signal optical pulse or a reference optical pulse and thereby the optical pulse is phase-modulated, and no electrical pulse is applied to the other optical pulse and the other optical pulse is not phase-modulated, as in the conventional art.

Since electrical pulses have a narrow pulse width of a few ns (nanoseconds), they have a very small duty at low drive frequencies up to several tens of MHz (megahertz). The duty is a ratio of a pulse width to a pulse period. When the duty is very small, the DC (direct current) floor of electrical pulses remains constant regardless of a change in the signal value of an electrical pulse (i.e., the presence or absence of an electrical pulse) due to a change in the value of a data signal (i.e., information superimposed on the phase difference between a signal optical pulse and a reference optical pulse). On the other hand, at high drive frequencies over 100 MHz, the duty increases and thus the DC floor fluctuates according to a change in the signal value of an electrical pulse. As a result, the other optical pulse not to be phase-modulated is also phase-modulated by the amount corresponding to the fluctuation in the DC floor. This unexpected phase modulation is equivalent to the generation of a noise component on the phase difference between the signal optical pulse and the reference optical pulse, leading to a reduction in interference visibility and ultimately to an increase in communication errors.

FIG. 11 shows results of a simulation conducted on the relationship between changes in the signal values of electrical pulses and fluctuations in the DC floor.

In this simulation, a pulse generator was used to generate an input signal with a repeat rate of 20 MHz, a pulse width of 10 ns, and a wave height of 0.5 V. Then, four types of signal waves each with a pulse interval of (a) 50 ns, (b) 100 ns, (c) 150 ns, and (d) 200 ns were simulated by manipulating the pattern of the input signal. For example, from a pattern of 11111111 . . . , the signal wave (a) can be generated. Alternatively, from a pattern of 00010001 . . . , the signal wave (d) can be generated. When the signal waves of (a) to (d) were input to a wide-band amplifier (an SHF100AP was used), output signals as shown in FIG. 11 were obtained. The DC floor of each output signal was: (a) −710 mV (millivolts), (b) −330 mV, (c) −250 mV, and (d) −170 mV. From these results, it can be seen that the narrower the pulse interval, that is, the greater the duty, the lower the DC floor becomes. In this simulation, the frequency was 20 MHz and the pulse width was 10 ns, but a similar phenomenon is expected to occur with a frequency of 100 MHz or higher and a pulse width of a few ns.

As described above, in the conventional art, an unexpected fluctuation occurs in the DC floor due to a change in the signal value of an electrical pulse. Thus, in a quantum cryptography communication apparatus incorporating a conventional phase modulation apparatus, only low-quality communication with noise has been possible.

The present invention aims, for example, to provide a phase modulation apparatus that realizes high-precision phase modulation in high-speed phase modulation of dual optical pulses.

Solution to Problem

A phase modulation apparatus according to one aspect of the present invention includes an optical pulse output unit configured to input an optical pulse, and, from the input optical pulse, generate and output a first optical pulse and a second optical pulse following the first optical pulse with a predetermined time difference; and a phase modulation unit configured to input a first electrical pulse having a predetermined voltage and phase-modulate the first optical pulse output from the optical pulse output unit according to a voltage of the input first electrical pulse, and also to input a second electrical pulse having a predetermined potential difference relative to the first electrical pulse and phase-modulate the second optical pulse output from the optical pulse output unit according to a voltage of the input second electrical pulse.

The first electrical pulse and the second electrical pulse have opposite polarities.

The phase modulation apparatus further includes an electrical pulse output unit configured to input an electrical pulse and output the input electrical pulse as the first electrical pulse in accordance with a timing in which the first optical pulse is output from the optical pulse output unit, and also to invert a polarity of the input electrical pulse and output the electrical pulse with the inverted polarity as the second electrical pulse, with a time difference corresponding to the predetermined time difference, wherein the phase modulation unit applies the first electrical pulse output from the electrical pulse output unit to the first optical pulse output from the optical pulse output unit to phase-modulate the first optical pulse, and applies the second electrical pulse output from the electrical pulse output unit to the second optical pulse output from the optical pulse output unit to phase-modulate the second optical pulse.

The first electrical pulse and the second electrical pulse are a rectangular wave.

The first electrical pulse and the second electrical pulse have a duty of 50%.

The first electrical pulse and the second electrical pulse are a sawtooth wave.

A transmitting apparatus according to one aspect of the present invention includes
- the phase modulation apparatus; and
- a transmitting unit configured to transmit the first optical pulse and the second optical pulse phase-modulated by the phase modulation unit of the phase modulation apparatus to a receiving apparatus via an optical path.

A receiving apparatus according to one aspect of the present invention includes
- a receiving unit configured to receive from the transmitting apparatus via the optical path the first optical pulse and the second optical pulse that are phase-modulated;
- a phase modulation unit configured to input a first electrical pulse having a predetermined voltage and phase-modulate the first optical pulse received by the receiving unit according to a voltage of the input first electrical pulse, and also to input a second electrical pulse having a predetermined potential difference relative to the first electrical pulse and phase-modulate the second optical pulse received by the receiving unit according to a voltage of the input second electrical pulse; and
- a phase difference detection unit configured to detect a phase difference between the first optical pulse and the second optical pulse phase-modulated by the phase modulation unit.

A phase modulation method according to one aspect of the present invention includes,
- by an optical pulse output unit, inputting an optical pulse;
- by the optical pulse output unit, from the input optical pulse, generating and outputting a first optical pulse and a second optical pulse following the first optical pulse with a predetermined time difference;
- by a phase modulation unit, inputting a first electrical pulse having a predetermined voltage;
- by the phase modulation unit, phase-modulating the first optical pulse output from the optical pulse output unit according to a voltage of the input first electrical pulse;
- by the phase modulation unit, inputting a second electrical pulse having a predetermined potential difference relative to the first electrical pulse; and
- by the phase modulation unit, phase-modulating the second optical pulse output from the optical pulse output unit according to a voltage of the input second electrical pulse.

The first electrical pulse and the second electrical pulse have opposite polarities.

The phase modulation method further includes,
- by an electrical pulse output unit, inputting an electrical pulse;
- by the electrical pulse output unit, outputting the input electrical pulse as the first electrical pulse in accordance with a timing in which the first optical pulse is output from the optical pulse output unit; and
- by the electrical pulse output unit, inverting a polarity of the input electrical pulse and outputting the electrical pulse with the inverted polarity as the second electrical pulse, with a time difference corresponding to the predetermined time difference, wherein, by the phase modulation unit, the phase-modulating of the first optical pulse applies the first electrical pulse output from the electrical pulse output unit to the first optical pulse output from the optical pulse output unit to phase-modulate the first optical pulse, and by the phase modulation unit, the phase-modulating of the second optical pulse applies the second electrical pulse output from the electrical pulse output unit to the second optical pulse output from the optical pulse output unit to phase-modulate the second optical pulse.

The first electrical pulse and the second electrical pulse are a rectangular wave.

The first electrical pulse and the second electrical pulse have a duty of 50%.

The first electrical pulse and the second electrical pulse are a sawtooth wave.

Advantageous Effects of Invention

According to one aspect of the present invention, a phase modulation unit phase-modulates the first optical pulse according to the voltage of the first electrical pulse and also phase-modulates the second optical pulse according to the voltage of the second electrical pulse having a predetermined potential difference relative to the first electrical pulse, thereby achieving high-precision phase modulation in high-speed phase modulation of dual optical pulses. For example, by incorporating a phase modulation apparatus including such a phase modulation unit in a quantum cryptography communication apparatus, communication quality is enhanced.

DESCRIPTION OF PREFERRED EMBODIMENTS

Embodiments of the present invention will be hereinafter described with reference to drawings.

Embodiment 1

FIG. 1 is a block diagram showing a configuration example of a quantum cryptography communication apparatus incorporating phase modulation apparatuses 100 and 200 according to this embodiment.

In FIG. 1, a quantum cryptography transmitting apparatus 101 is an example of a transmitting apparatus, and includes, in addition to the phase modulation apparatus 100, a (single) photon source 102, an asymmetric Mach-Zehnder interferometer 103, and a transmitting unit 104. The phase modulation apparatus 100 includes a phase modulator 105.

A quantum cryptography receiving apparatus 201 is an example of a receiving apparatus, and includes, in addition to the phase modulation apparatus 200, a receiving unit 202, an asymmetric Mach-Zehnder interferometer 203, and a pair of photon detectors 204 and 205. The phase modulation apparatus 200 includes a phase modulator 206.

In the quantum cryptography transmitting apparatus 101, a photon emitted from the photon source 102 becomes, when passing through the asymmetric Mach-Zehnder interferometer 103, a dual optical pulse with a time difference composed of a signal optical pulse and a reference optical pulse. This dual optical pulse is phase-modulated in the phase modulator 105, and is then transmitted from the transmitting unit 104 to the quantum cryptography receiving apparatus 201 via a quantum communication channel 301 which is an example of an optical path. As will be described later, a dual electrical pulse is input to the phase modulator 105 in accordance with the timing of the dual optical pulse. This dual electrical pulse is applied to the dual optical pulse and acts as a modulation signal.

In the quantum cryptography receiving apparatus 201, the dual optical pulse transmitted from the quantum cryptography transmitting apparatus 101 is received in the receiving unit 202. This dual optical pulse is phase-modulated in the phase modulator 206, and then passes through the asymmetric Mach-Zehnder interferometer 203. At this time, the signal optical pulse and the reference optical pulse interfere with each other, and are detected in either of the photon detectors 204 and 205 connected respectively with two ports of the asymmetric Mach-Zehnder interferometer 203. As with the phase modulator 105 of the quantum cryptography transmitting apparatus 101, a dual electrical pulse is input to the phase modulator 206 in accordance with the timing of the dual optical pulse. This dual electrical pulse is applied to the dual optical pulse and acts as a demodulation signal.

FIG. 2 is a block diagram showing a configuration of the phase modulation apparatus 100 incorporated in the quantum cryptography transmitting apparatus 101. FIG. 3 is a timing chart showing the timing of phase modulation and the waveform of electrical pulses in the phase modulation apparatus 100.

In FIG. 2, the phase modulation apparatus 100 includes the phase modulator 105 and a modulation signal generator 106.

The phase modulator 105 phase-modulates an optical pulse passing therethrough in proportion to the applied voltage of an electrical pulse. For example, using an electro-optical effect that the refractive index of an optical pulse changes according to the bias voltage of an applied electrical pulse, the phase modulator 105 can phase-modulate an optical pulse by changing the optical path length of the optical pulse. In FIG. 2, the signal optical pulse and the reference optical pulse input to the phase modulator 105 are represented as SP and RP, respectively. The signal optical pulse and the reference optical pulse output from the phase modulator 105, that is, the phase-modulated signal optical pulse and the phase-modulated reference optical pulse are represented as SP' and RP', respectively.

At the input timing of a trigger signal, the modulation signal generator 106 outputs an electrical pulse with a predetermined bias according to an input of a four-valued data signal (may also be two-valued or multiple-valued), for example. The trigger signal is a clock or a signal synchronized with a clock, and the same signal is also input to the photon source 102. This makes it possible to match the timing in which the dual optical pulse passes through the phase modulator 105 and the timing in which the dual electrical pulse is applied from the modulation signal generator 106. In this embodiment, the modulation signal generator 106 outputs, for one input of the trigger signal, a dual electrical pulse having a time difference and having opposite polarities. The time difference of the dual electrical pulse corresponds with the time difference of the dual optical pulse that passes through the phase modulator 105.

As shown in FIG. 3, a signal optical pulse and a reference optical pulse are repeatedly input to the phase modulator 105 with a given time difference. Likewise, the trigger signal is repeatedly input to the modulation signal generator 106, so that the data signal is switched. When the trigger signal is input, the modulation signal generator 106 applies to the phase modulator 105 an electrical pulse having an amplitude specified by the data signal, in accordance with the timing in which the signal optical pulse passes through the phase modulator 105. Then, in accordance with the timing in which the reference optical pulse passes through the phase modulator 105, the modulation signal generator 106 applies to the phase modulator 105 an electrical pulse having the opposite polarity and the same amplitude relative to the electrical pulse applied to the signal optical pulse. That is, the modulation signal generator 106 applies to the phase modulator 105 a pair of electrical pulses of mutually opposite polarities every time a pair of optical pulses passes through the phase modulator 105.

By applying electrical pulses in the manner described above, this embodiment provides the following advantageous effect, compared with the conventional art wherein an electrical pulse is applied only to a signal optical pulse.

According to this embodiment, a fluctuation in the DC floor of electrical pulses applied to the phase modulator 105, which is caused by a change in the pattern of the electrical pulses due to a change in the data signal, can be suppressed to virtually zero. This makes it possible to avoid a situation where, as with the conventional art, a reference optical pulse is also phase-modulated due to a fluctuation in the DC floor, thereby generating noise. Thus, phase modulation can always be performed precisely.

FIG. 4 shows results of a simulation conducted on the relationship between changes in the signal values of electrical pulses input to the phase modulator 105 and fluctuations in the DC floor.

In this simulation, a pulse generator was used to generate an input signal with a repeat rate of 20 MHz, a pulse width of 10 ns, and a wave peak-to-peak height of 0.5 V. Then, as with the simulation of FIG. 11, four types of signal waves each with a pulse interval of (a) 50 ns, (b) 100 ns, (c) 150 ns, and (d) 200 ns were simulated by manipulating the pattern of the input signal. When the signal waves of (a) to (d) were input to a wide-band amplifier (an SHF100AP was used), output signals as shown in FIG. 4 were obtained. The DC floor was virtually 0 V in all of the output signals. From these results, it can be seen that, in this embodiment, fluctuations in the DC floor can be suppressed even if the duty is large. In this simulation, the frequency was 20 MHz and the pulse width was 10 ns, but, as described previously, a similar effect can be expected with a frequency of 100 MHz or higher and a pulse width of a few ns.

As can be seen by comparing FIG. 4 and FIG. 11, in this embodiment, the amplitude (i.e., voltage) of an electrical pulse to be applied to a signal optical pulse and a reference optical pulse can be halved, compared to the conventional art wherein an electrical pulse is applied only to a single optical pulse. Therefore, as a driver in the modulation signal generator 106, an inexpensive amplifier with a smaller gain and a lower saturation power than the conventional art can be used.

A quantum cryptography communication method (i.e., procedure) according to this embodiment will be hereinafter described.

FIG. 5 is a flowchart showing the quantum cryptography communication procedure using the phase modulation method according to this embodiment.

In the quantum cryptography transmitting apparatus 101, the photon source 102 generates an optical pulse and inputs it to the asymmetric Mach-Zehnder interferometer 103. The asymmetric Mach-Zehnder interferometer 103 generates and outputs a signal optical pulse and a reference optical pulse from the optical pulse input by the photon source 102 (Step S101: optical pulse output step). A combination of the photon source 102 and the asymmetric Mach-Zehnder interferometer 103 is an example of an optical pulse output unit. The signal optical pulse is an example of the first optical pulse. The reference optical pulse is an example of the second optical pulse that follows the first optical pulse with a predetermined time difference.

The modulation signal generator 106 of the phase modulation apparatus 100 inputs an electrical pulse having a predetermined voltage. The modulation signal generator 106 outputs the input electrical pulse as the first electrical pulse in accordance with the timing in which the signal optical pulse is output from the asymmetric Mach-Zehnder interferometer 103. The modulation signal generator 106 also inverts the polarity of the input electrical pulse, and, with a time difference corresponding to the predetermined time difference (i.e., the time difference between the signal optical pulse and the reference optical pulse), outputs the electrical pulse of the inverted polarity as the second electrical pulse (Step S101: electrical pulse output step). The modulation signal generator 106 is an example of an electrical pulse output unit. The first electrical pulse is an electrical pulse having a voltage according to the value of a data signal (the voltage can be a half of what is conventionally used), and serves as a modulation signal of the signal optical pulse. The data signal is encoded information to be transmitted by quantum cryptography communication, and is input from an input device (e.g., a keyboard or a mouse, though not illustrated) or a storage device (e.g., an HDD (Hard Disk Drive), though not illustrated) of the quantum cryptography transmitting apparatus 101 to the modulation signal generator 106. The second electrical pulse is an electrical pulse having a predetermined potential difference relative to the first electrical pulse, and serves as a modulation signal of the reference optical pulse. The potential difference between the first electrical pulse and the second electrical pulse is preferably such that the DC component can be canceled. In this embodiment, the potential difference is secured simply by arranging for the first electrical pulse and the second electrical pulse to have opposite polarities.

The phase modulator 105 of the phase modulation apparatus 100 inputs the first electrical pulse output from the modulation signal generator 106, and phase-modulates the signal optical pulse output from the asymmetric Mach-Zehnder interferometer 103 according to the voltage of the input first electrical pulse. That is, the phase modulator 105 applies the first electrical pulse output from the modulation signal generator 106 to the signal optical pulse output from the asymmetric Mach-Zehnder interferometer 103 to phase-modulate the signal optical pulse. The phase modulator 105 also inputs the second electrical pulse output from the modulation signal generator 106, and phase-modulates the second optical pulse output from the asymmetric Mach-Zehnder interferometer 103 according to the voltage of the input second electrical pulse. That is, the phase modulator 105 applies the second electrical pulse output from the modulation signal generator 106 to the reference optical pulse output from the asymmetric Mach-Zehnder interferometer 103 to phase-modulate the reference optical pulse (Step S102: phase modulation step). The phase modulator 105 is an example of a phase modulation unit.

For example, assuming that the data signal to be input to the modulation signal generator 106 is four-valued (i.e., when the information to be transmitted by quantum cryptography communication is two bits), in the electrical pulse output step (Step S101), the data signal representing a value of 00, 10, 01 or 11 (i.e., two-bit information) is input from the input device or the storage device of the quantum cryptography transmitting apparatus 101 to the modulation signal generator 106. The modulation signal generator 106 generates the first electrical pulse and the second electrical pulse according to the value of the data signal, and controls the phase difference to be provided between the signal optical pulse and the reference optical pulse in the phase modulation step (Step S102). For example, to the data signal values 00, 10, 01 and 11, the phase differences 0, $\pi$, $-\pi/2$ and $\pi/2$ can be assigned, respectively. Here, the phase difference 0 is assumed to be equal to $2n\pi$, where n is an integer satisfying n>1. Likewise, the phase differences $\pi$, $-\pi/2$ and $\pi/2$ are assumed to be equal to $2n\pi+\pi$, $2n\pi-(\pi/2)$ and $2n\pi+(\pi/2)$, respectively.

The transmitting unit 104 transmits the signal optical pulse and the reference optical pulse phase-modulated by the phase modulator 105 of the phase modulation apparatus 100 to the quantum cryptography receiving apparatus 201 via the quantum communication channel 301 (Step S103: transmitting step).

In the quantum cryptography receiving apparatus 201, the receiving unit 202 receives the phase-modulated signal optical pulse and the phase-modulated reference optical pulse from the quantum cryptography transmitting apparatus 101 via the quantum communication channel 301 and outputs these optical pulses (Step S104: receiving step).

A modulation signal generator (not illustrated) of the phase modulation apparatus 200 inputs an electrical pulse having a predetermined voltage. The modulation signal generator outputs the input electrical pulse as the first electrical pulse in accordance with the timing in which the signal optical pulse is output from the receiving unit 202. The modulation signal generator 106 also inverts the polarity of the input electrical pulse, and, with a time difference corresponding to the predetermined time difference (i.e., the time difference between the signal optical pulse and the reference optical pulse), outputs the electrical pulse of the inverted polarity as the second electrical pulse (Step S104: electrical pulse output step). As with the modulation signal generator 106 of the quantum cryptography transmitting apparatus 101, the modulation signal generator of the phase modulation apparatus 200 is also an example of an electrical pulse output unit. The first electrical pulse is an electrical pulse having a voltage according to the value of a data signal (the voltage can be a half of what is conventionally used), and serves as a demodulation signal of the signal optical pulse. The data signal is a signal indicating the value of a random number (hereinafter this signal will simply be referred to as a "random number"), and is input from a random number generator (not illustrated) of the quantum cryptography receiving apparatus 201 to the modulation signal generator. The second electrical pulse is an electrical pulse having a predetermined potential difference relative to the first electrical pulse, and serves as a demodulation signal of the reference optical pulse. The potential difference between the first electrical pulse and the second electrical pulse is the same as that of the modulation signal generator 106 of the quantum cryptography transmitting apparatus 101.

The phase modulator 206 of the phase modulation apparatus 200 inputs the first electrical pulse output from the modulation signal generator, and phase-modulates the signal optical pulse received by the receiving unit 202 according to the voltage of the input first electrical pulse. That is, the phase modulator 206 applies the first electrical pulse output from the modulation signal generator to the signal optical pulse output from the receiving unit 202 to phase-demodulate the signal optical pulse. The phase modulator 206 also inputs the second electrical pulse output from the modulation signal generator, and phase-modulates the second optical pulse received by the receiving unit 202 according to the voltage of the input second electrical pulse. That is, the phase modulator 206 applies the second electrical pulse output from the modulation signal generator to the reference optical pulse output from the receiving unit 202 to phase-demodulate the reference optical pulse (Step S105: phase demodulation step). The phase modulator 206 is an example of a phase modulation unit, and the same type as the phase modulator 105 of the quantum cryptography transmitting apparatus 101 can be used.

Either of the photon detectors 204 and 205 detects the phase difference between the signal optical pulse and the reference optical pulse phase-demodulated by the phase modulator 206. The photon detectors 204 and 205 are examples of a phase difference detection unit (Step S106: phase difference detection step).

For example, assuming that the data signal to be input to the modulation signal generator 106 of the quantum cryptography transmitting apparatus 101 is four-valued (i.e., when the information to be transmitted by quantum cryptography communication is two bits), in the receiving step (Step S104), a dual optical pulse with a phase difference of 0, π, −π/2 or π/2 is received in the receiving unit 202. In the electrical pulse output step (Step S104), a random number having a value of 0 or 1 (i.e., a one-bit random number) is input from the random number generator of the quantum cryptography receiving apparatus 201 to the modulation signal generator. The modulation signal generator generates the first electrical pulse and the second electrical pulse according to the value of the random number to control the amount of phase modulation to be performed on the signal optical pulse and the reference optical pulse in the phase demodulation step (Step S105) (i.e., to control the phase difference to be provided between the signal optical pulse and the reference optical pulse). For example, to the random number values 0 and 1, the amounts of phase modulation 0 and π/2 can be assigned, respectively.

If the value of the random number is 0 in the electrical pulse output step (Step S104), the amount of phase modulation in the phase demodulation step (Step S105) is 0. Thus, dual optical pulses with phase differences of 0, π, −π/2 and π/2 received in the receiving step (Step S104) become dual optical pulses with phase differences of 0, π, −π/2 and π/2, respectively, (i.e., not phase-modulated) in the phase demodulation step (Step S105). For example, by using a photon detector configured to detect a photon with a phase difference of 0 as the photon detector 204 and a photon detector configured to detect a photon with a phase difference of it as the photon detector 205, the photon detector 204 can detect a dual optical pulse with a phase difference of 0 and the photon detector 205 can detect a dual optical pulse with a phase difference of it in the phase difference detection step (Step S106). If the photon detector 204 detects a dual optical pulse with a phase difference of 0, the value of the data signal input to the modulation signal generator 106 of the quantum cryptography transmitting apparatus 101 can be determined as 00. If the photon detector 205 detects a dual optical pulse with a phase difference of π, the value of the data signal input to the modulation signal generator 106 of the quantum cryptography transmitting apparatus 101 can be determined as 10. The value of the data signal (i.e., two-bit information) obtained in the phase difference detection step (Step S106) is output, for example, by an output device (e.g., an LCD (Liquid Crystal Display), though not illustrated) of the quantum cryptography receiving apparatus 201. Then, it is used, for example, as cryptographic key information or as part thereof by a processing device (e.g., a CPU (Central Processing Unit), though not illustrated) of the quantum cryptography receiving apparatus 201.

On the other hand, if the value of the random number is 1 in the electrical pulse output step (Step S104), the amount of phase modulation in the phase demodulation step (Step S105) is π/2. Thus, dual optical pulses with phase differences of 0, π, −π/2 and π/2 received in the receiving step (Step S104) become dual optical pulses with phase differences of π/2, −π/2, 0 and π, respectively, in the phase demodulation step (Step S105). For example, as described above, by using a photon detector configured to detect a photon with a phase difference of 0 as the photon detector 204 and a photon detector configured to detect a photon with a phase difference of π as the photon detector 205, the photon detector 204 can detect a dual optical pulse with a phase difference of 0 and the photon detector 205 can detect a dual optical pulse with a phase difference of π in the phase difference detection step (Step S106). If the photon detector 204 detects a dual optical pulse with a phase difference of 0, the value of the data signal input to the modulation signal generator 106 of the quantum cryptography transmitting apparatus 101 can be determined as 01. If the photon detector 205 detects a dual optical pulse with a phase difference of π, the value of the data signal input to the modulation signal generator 106 of the quantum cryptography transmitting apparatus 101 can be determined as 11. The value of the data signal (i.e., two-bit information) obtained in the phase difference detection step (Step S106) is output, for example, by the output device (not illustrated) of the quantum cryptography receiving apparatus 201, as described above. Then, it is used, for example, as cryptographic key information or as part thereof by the processing device (not illustrated) of the quantum cryptography receiving apparatus 201.

As has been described, according to this embodiment, the phase modulation unit (e.g., the phase modulators 105, 206) phase-modulates the first optical pulse (e.g., a signal optical pulse) according to the voltage of the first electrical pulse, and also phase-modulates the second optical pulse (e.g., a reference optical pulse) according to the voltage of the second electrical pulse having a predetermined potential difference relative to the first electrical pulse, thereby achieving high-precision phase modulation in high-speed phase modulation of dual optical pulses. By incorporating a phase modulation apparatus including such a phase modulation unit (e.g., the phase modulation apparatuses 100, 200) in a quantum cryptography communication apparatus (e.g., the quantum cryptography transmitting apparatus 101, the quantum cryptography receiving apparatus 201), communication quality is enhanced.

As presented above, the phase modulation apparatus according to this embodiment is a phase modulation apparatus that employs the phase modulation method in which information is superimposed on the phase difference between two optical pulses with a time difference, namely a signal optical pulse and a reference optical pulse, and includes the phase modulator and the modulation signal generator for quantum cryptography. In the phase modulation apparatus, the signal optical pulse and the reference optical pulse pass through the phase modulator, and are phase-modulated depending on the presence or absence of a modulation signal. The modulation signal generator outputs an electrical pulse signal used for modulation. The amplitude of the electrical pulse signal used for modulation is selected according to a data signal used for phase modulation. The output timing of the electrical pulse signal used for modulation is synchronized with a trigger signal. The electrical pulse signal used for modulation is generated in accordance with the time difference between the signal optical pulse and the reference optical pulse, and is composed of two modulation electrical pulse signals of mutually inverted polarities. The signal optical pulse and the reference optical pulse are phase-modulated with mutually inverted polarities.

Embodiment 2

This embodiment, mainly differences from the first embodiment, will be described.

A quantum cryptography communication apparatus incorporating the phase modulation apparatuses 100 and 200 according to this embodiment can be configured as shown in FIG. 1, as with the first embodiment. The configuration of the phase modulation apparatus 100 is the same as that of the first embodiment shown in FIG. 2.

As shown in FIG. 3, in the first embodiment, when the trigger signal is input, the modulation signal generator 106 applies to the phase modulator 105 the first electrical pulse having an amplitude specified by the data signal, in accordance with the timing in which the signal optical pulse passes through the phase modulator 105. Then, in accordance with the timing in which the reference optical pulse passes through the phase modulator 105, the modulation signal generator 106 applies to the phase modulator 105 the second electrical pulse having the opposite polarity and the same amplitude relative to the electrical pulse applied to the signal optical pulse. The first electrical pulse and the second electrical pulse of FIG. 3 are a rectangular wave having the same pulse width as the pulse width of the signal optical pulse and the reference optical pulse, but the pulse width of the first electrical pulse and the second electrical pulse may be wider.

FIG. 6 is a timing chart showing the timing of phase modulation and the waveform of electrical pulses in the phase modulation apparatus 100 according to this embodiment.

As shown in FIG. 6, the pulse width of the first electrical pulse and the second electrical pulse, that is, the electrical pulses applied to the phase modulator 105, may be 50% of the pulse period, instead of being the same as the pulse width of the optical pulses. In other words, the first electrical pulse and the second electrical pulse output from the modulation signal generator 106 may have a duty of 50%. This makes it easier to generate the electrical pulses, thereby facilitating implementation of the phase modulation apparatus 100. The same can be said of the phase modulation apparatus 200.

Embodiment 3

FIG. 7 is a diagram showing an example of a detailed configuration of the phase modulation apparatus 100 (especially the modulation signal generator 106) according to the first embodiment shown in FIG. 2.

In FIG. 7, the modulation signal generator 106 includes an electrical pulse generator 107, a delay line 108, and a differential amplifier 109.

The electrical pulse generator 107 generates, in synchronization with an input of the trigger signal, an electrical pulse of an amplitude set by the data signal. The electrical pulse generator 107 outputs the generated electrical pulse as a signal pulse modulation signal and a reference pulse modulation signal from two output ports. At this time, the signal pulse modulation signal and the reference pulse modulation signal have the same amplitude. The signal pulse modulation signal is directly input to the differential amplifier 109. On the other hand, the reference pulse modulation signal is input to an inverter input port of the differential amplifier 109 via the delay line 108 that adds a delay corresponding to the time difference between the signal optical pulse and the reference optical pulse. The differential amplifier 109 performs signal amplification as appropriate according to the characteristics of the phase modulator 105, and then applies the amplified signal pulse modulation signal and the amplified reference pulse modulation signal to the phase modulator 105.

In this embodiment, by using the configuration described above, it is possible to easily generate a dual electrical pulse having mutually inverted polarities and having a time difference as shown in the timing chart of FIG. 2.

As described above, the modulation signal generator of the phase modulation apparatus according to this embodiment outputs two channels of electrical pulse signals amplitude-modulated by the data signal. In the modulation signal generator, one signal of the two output signals is directly input to the differential amplifier for modulating the signal optical pulse. The other signal is delayed by the delay line in accordance with the time difference of the optical pulses and is then input to the inverter input of the differential amplifier. Each signal is amplified to an appropriate phase modulation voltage in the differential amplifier and is output.

Embodiment 4

This embodiment, mainly differences from the first embodiment, will be described.

A quantum cryptography communication apparatus incorporating the phase modulation apparatuses 100 and 200 according to this embodiment can be configured as shown in FIG. 1, as with the first embodiment. The configuration of the phase modulation apparatus 100 is the same as that of the first embodiment shown in FIG. 2.

As shown in FIG. 3, in the first embodiment, when the trigger signal is input, the modulation signal generator 106 applies to the phase modulator 105 the first electrical pulse having an amplitude specified by the data signal, in accordance with the timing in which the signal optical pulse passes through the phase modulator 105. Then, in accordance with the timing in which the reference optical pulse passes through the phase modulator 105, the modulation signal generator 106 applies to the phase modulator 105 the second electrical pulse having the opposite polarity and the same amplitude relative to the electrical pulse applied to the signal optical pulse. The first electrical pulse and the second electrical pulse of FIG. 3 are a rectangular wave having the same pulse width as the pulse width of the signal optical pulse and the reference optical pulse, but the first electrical pulse and the second electrical pulse may not be a rectangular wave.

FIG. 8 is a timing chart showing the timing of phase modulation and the waveform of electrical pulses in the phase modulation apparatus 100 according to this embodiment.

As shown in FIG. 8, the waveform of the first electrical pulse and the second electrical pulse, that is, the electrical pulses applied to the phase modulator 105, may be a sawtooth waveform. In other words, the first electrical pulse and the second electrical pulse output from the modulation signal generator 106 may be a sawtooth wave. This makes it possible to apply a dual electrical pulse with a required potential difference even if there is some gap between the timing in which the dual optical pulse passes through the phase modulator 105 and the timing in which the dual electrical pulse is applied to the phase modulator 105. That is, by applying sawtooth electrical pulses, the difference in the amount of phase modulation applied to the signal optical pulse and the reference optical pulse becomes constant, even if the timing of the electrical pulse relative to the optical pulse is not precise and there is some gap. In this way, phase modulation can be performed precisely. The same can be said of the phase modulation apparatus 200.

FIG. 8 shows an example in which the sweep range of the sawtooth wave is slightly longer than the time difference of the optical pulses, but the sweep range may be the same as or slightly shorter than the time difference of the optical pulses.

Alternatively, the sweep range may be the same as the pulse period. That is, as with the second embodiment, a sweep extending across the entire pulse period may be applied.

As presented above, the phase modulation apparatus according to this embodiment is a phase modulation apparatus that employs the phase modulation method in which information is superimposed on the phase difference between two optical pulses with a time difference, namely a signal optical pulse and a reference optical pulse, and includes the phase modulator and the modulation signal generator for quantum cryptography. In the phase modulation apparatus, the signal optical pulse and the reference optical pulse pass through the phase modulator, and are phase-modulated depending on the presence or absence of a modulation signal. The modulation signal generator outputs an electrical pulse signal used for modulation. The amplitude of the electrical pulse signal used for modulation is selected according to a data signal used for phase modulation. The output timing of the electrical pulse signal used for modulation is synchronized with a trigger signal. The electrical pulse signal used for modulation is a one-shot and sawtooth signal that cancels the DC component, and has a sweep time equivalent to or longer than the time difference between the signal optical pulse and the reference optical pulse. The signal optical pulse and the reference optical pulse are phase-modulated with mutually inverted polarities.

Having thus described the embodiments of the present invention, two or more of these embodiments may be implemented in combination. Alternatively, one of these embodiments may be implemented in part. Alternatively, two or more of these embodiments may be implemented in part and in combination.

BRIEF DESCRIPTION OF DRAWINGS

FIG. 11 is a diagram showing simulation results of the conventional art.

REFERENCE SIGNS LIST

Figure 1:
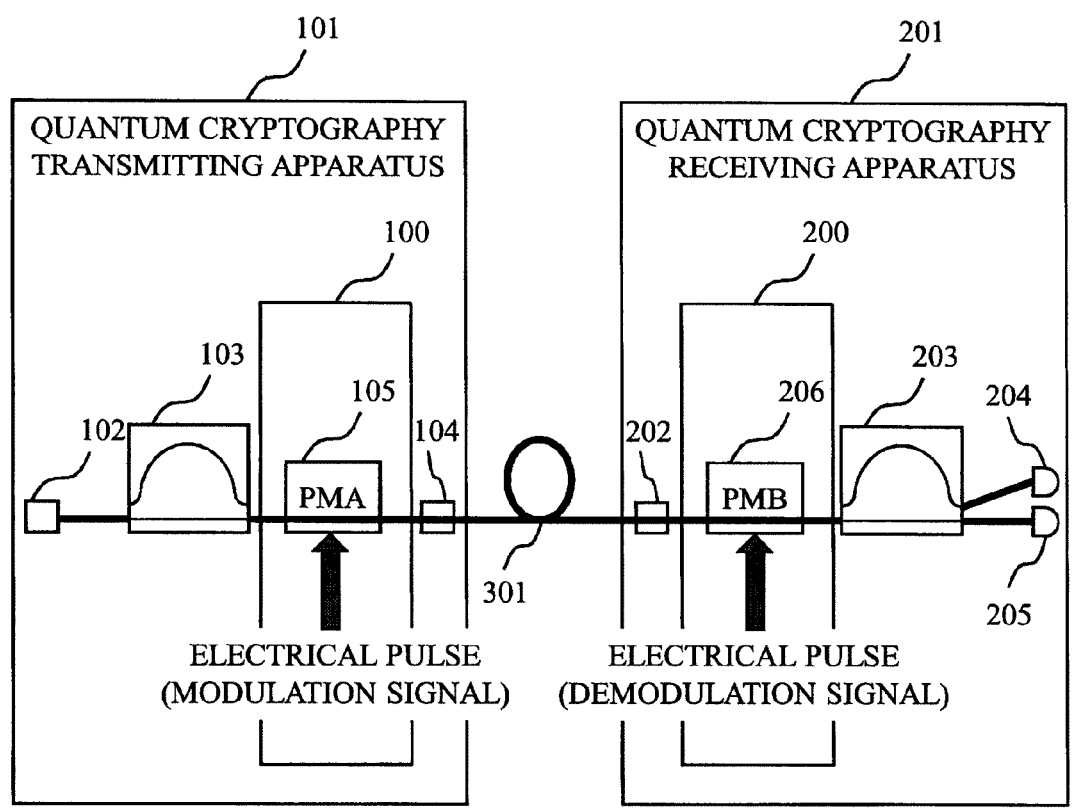
FIG. 1 is a block diagram showing a configuration example of a quantum cryptography communication apparatus incorporating a phase modulation apparatus according to the first embodiment.
Figure 2:
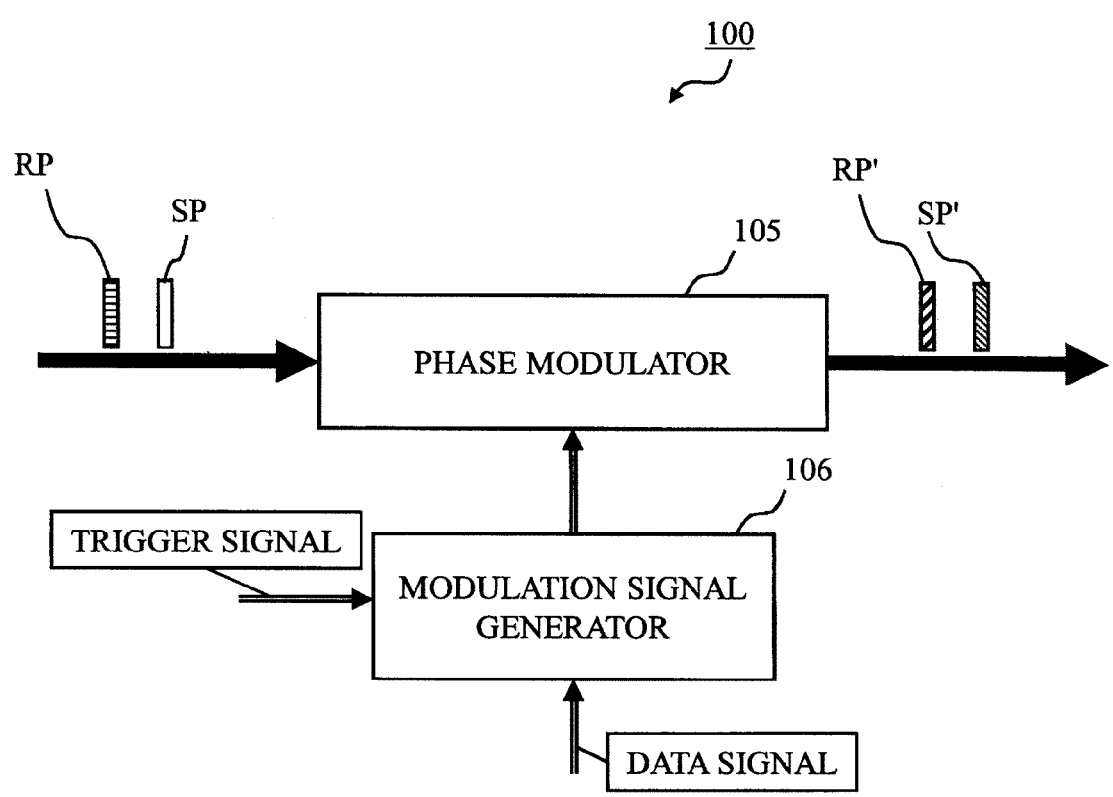
FIG. 2 is a block diagram showing a configuration of the phase modulation apparatus according to the first embodiment.
Figure 3:
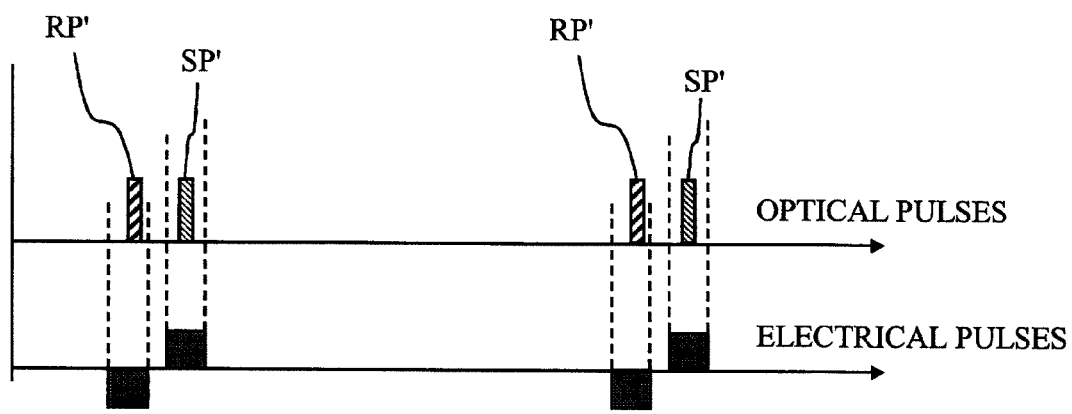
FIG. 3 is a timing chart showing the timing of phase modulation and the waveform of electrical pulses in the phase modulation apparatus according to the first embodiment.
Figure 4:
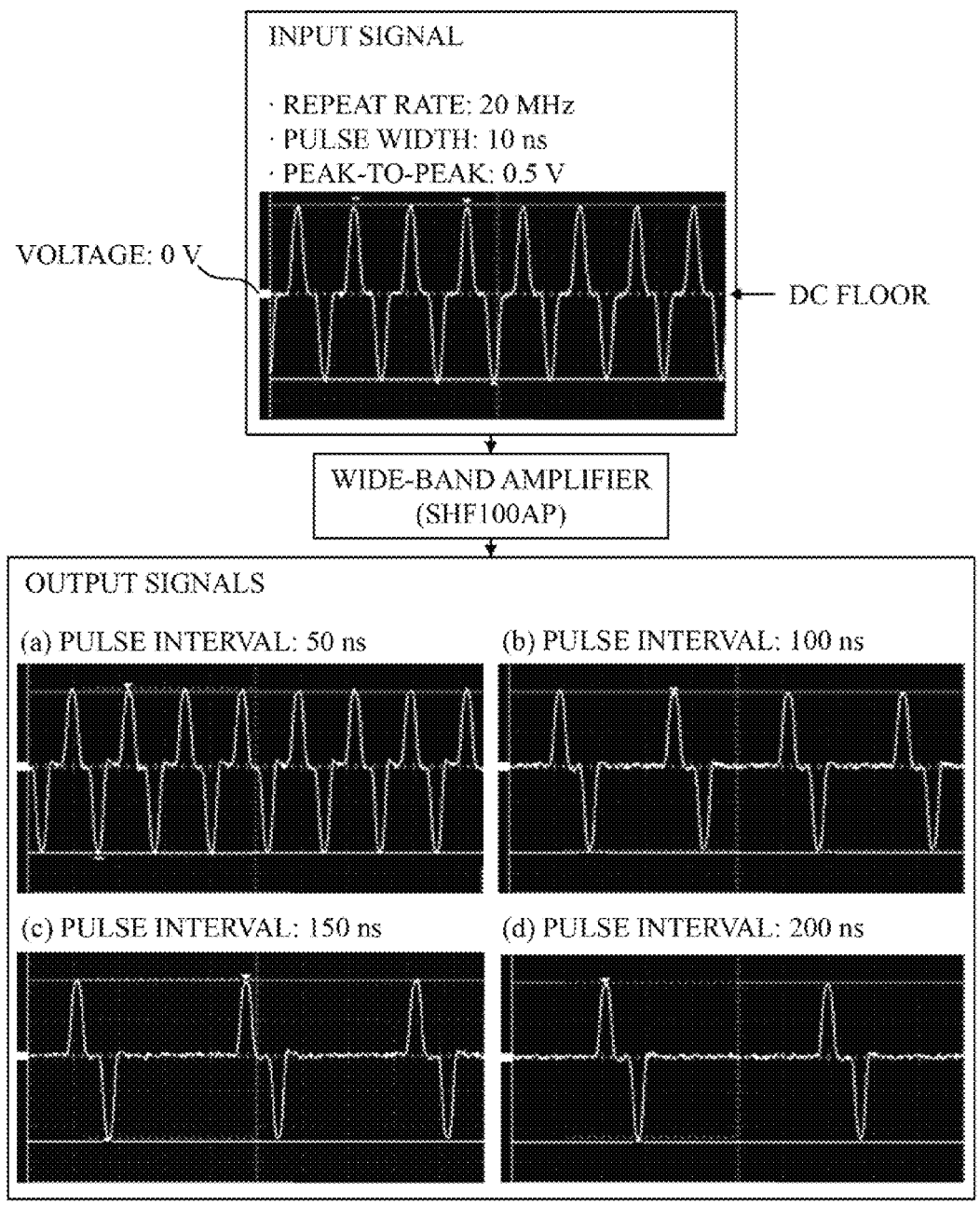
FIG. 4 is a diagram showing simulation results of the first embodiment.
Figure 5:
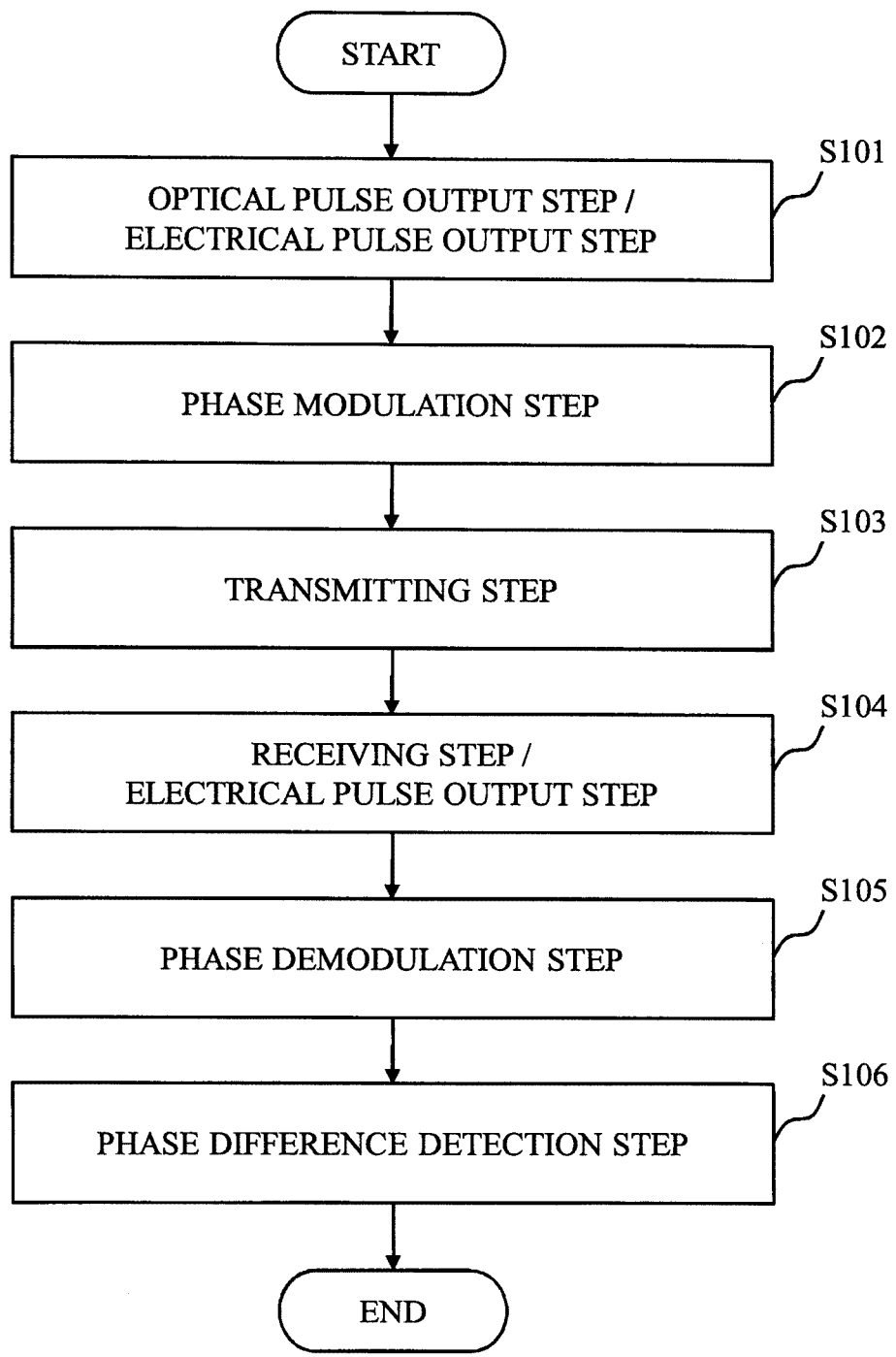
FIG. 5 is a flowchart showing a quantum cryptography communication procedure using a phase modulation method according to the first embodiment.
Figure 6:
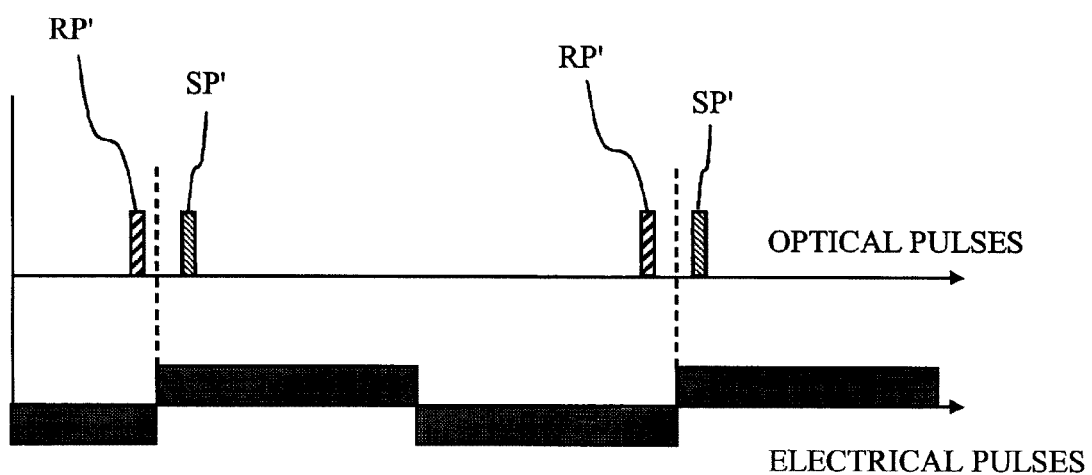
FIG. 6 is a timing chart showing the timing of phase modulation and the waveform of electrical pulses in a phase modulation apparatus according to the second embodiment.
Figure 7:
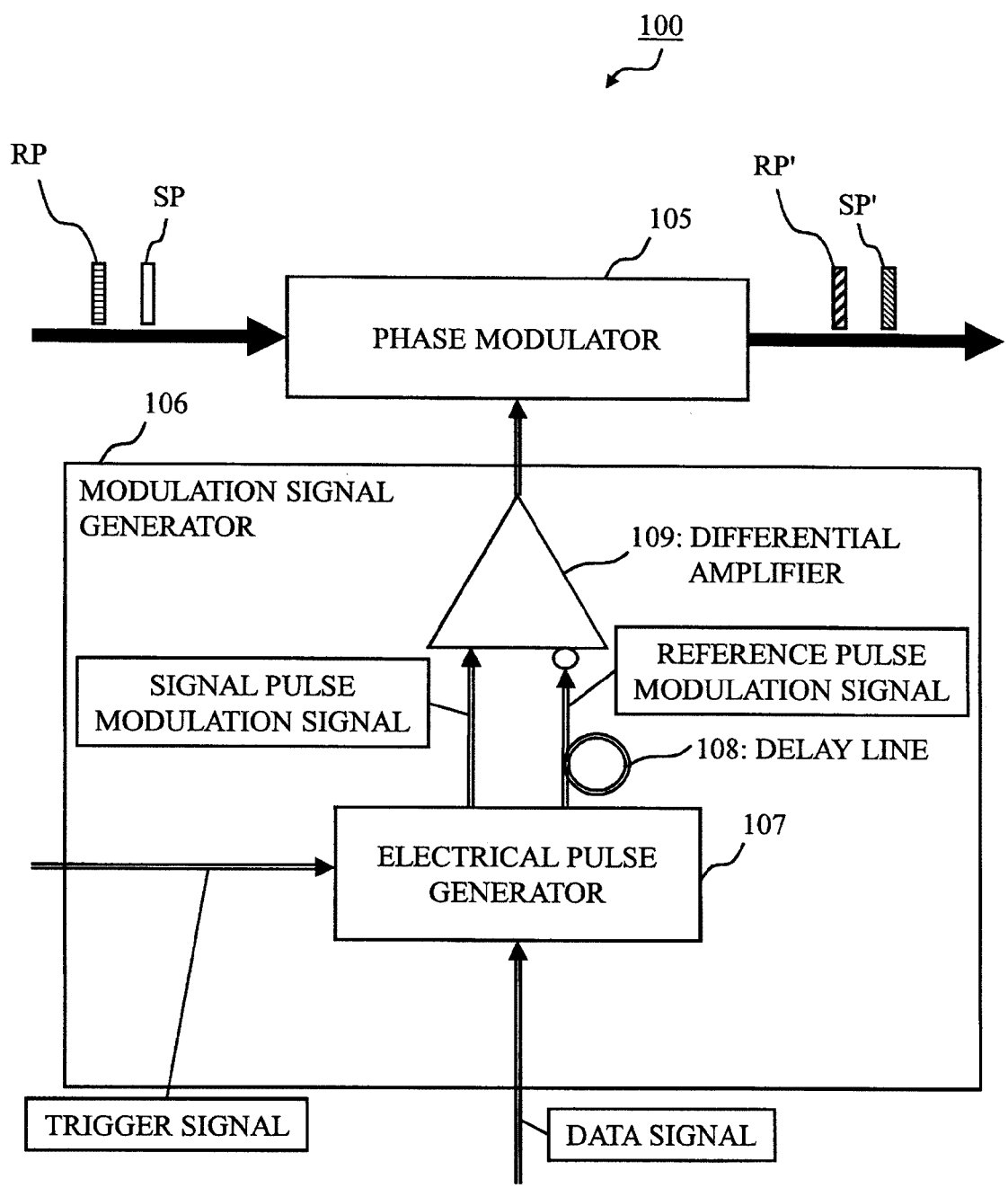
FIG. 7 is a diagram showing an example of a detailed configuration of a phase modulation apparatus according to the third embodiment.
Figure 8:
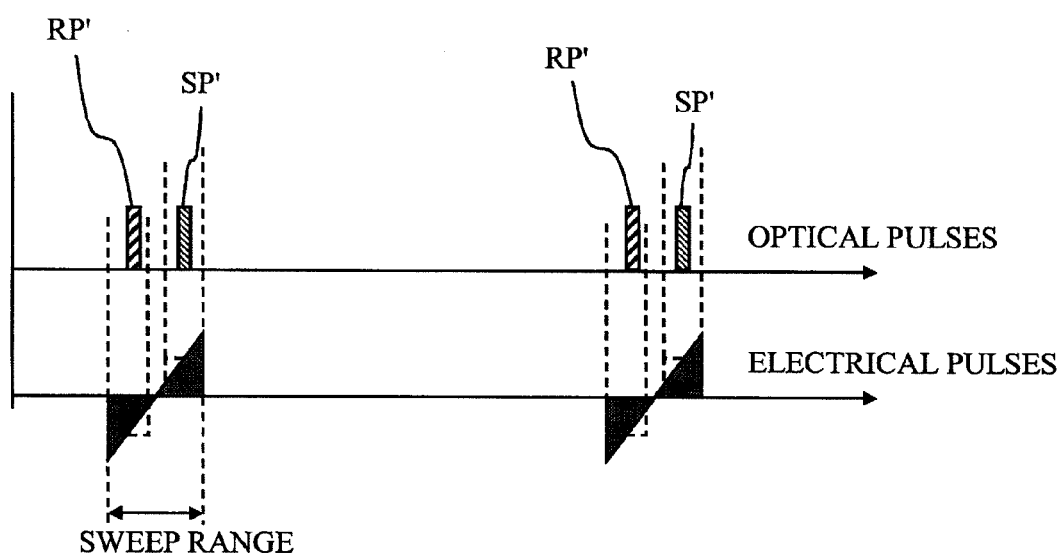
FIG. 8 is a timing chart showing the timing of phase modulation and the waveform of electrical pulses in a phase modulation apparatus according to the fourth embodiment.
Figure 9:
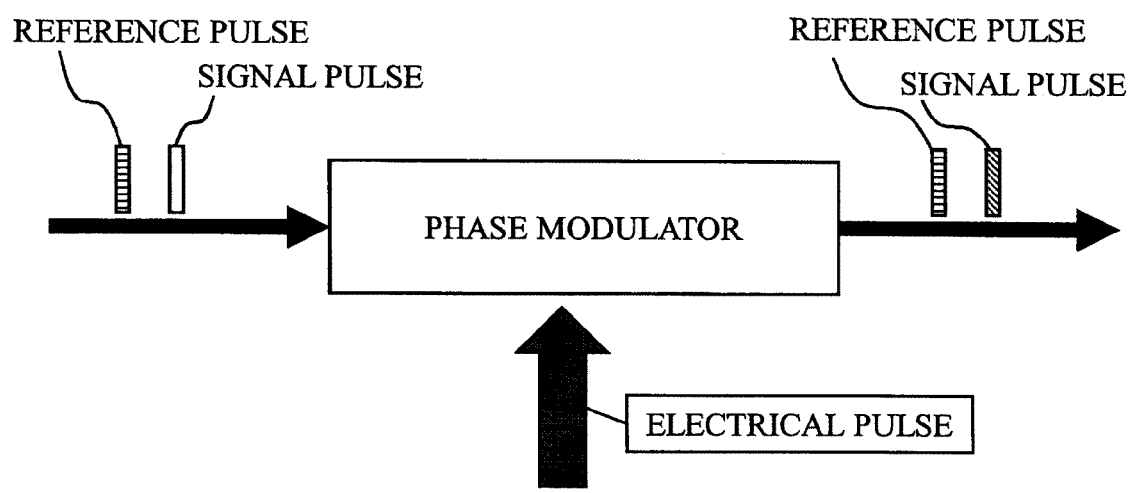
FIG. 9 is a block diagram showing a configuration of a conventional phase modulation apparatus.
Figure 10:
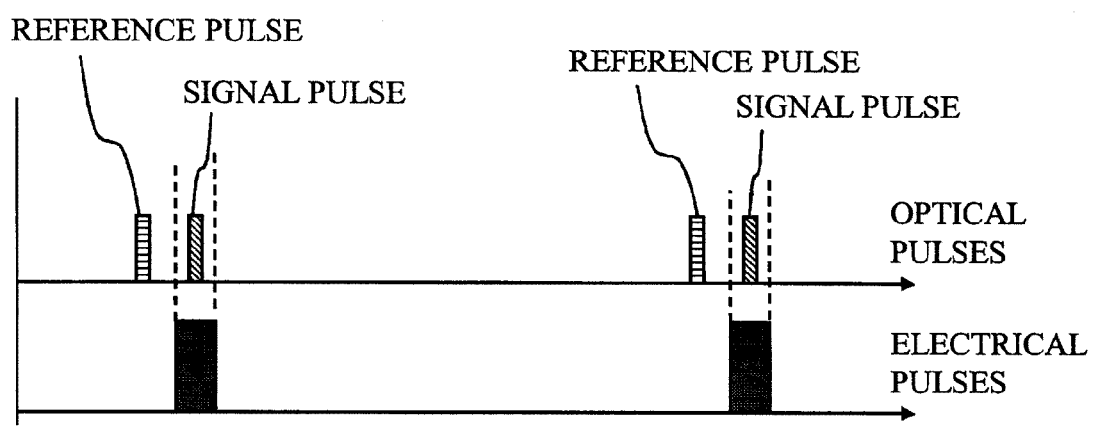
FIG. 10 is a timing chart showing the timing of phase modulation and the waveform of electrical pulses in the conventional phase modulation apparatus.

100: phase modulation apparatus, 101: quantum cryptography transmitting apparatus, 102: photon source, 103: asymmetric Mach-Zehnder interferometer, 104: transmitting unit, 105: phase modulator, 106: modulation signal generator, 107: electrical pulse generator, 108: delay line, 109: differential amplifier, 200: phase modulation apparatus, 201: quantum cryptography receiving apparatus, 202: receiving unit, 203: asymmetric Mach-Zehnder interferometer, 204: photon detector, 205: photon detector, 206: phase modulator, 301: quantum communication channel.

The invention claimed is:

1. A phase modulation apparatus comprising:
   an optical pulse output unit configured to input an optical pulse, and, from the input optical pulse, generate and output a first optical pulse and a second optical pulse following the first optical pulse with a predetermined time difference; and
   a phase modulation unit configured to
      input a first electrical pulse having a predetermined voltage and phase-modulate the first optical pulse output from the optical pulse output unit according to a voltage of the input first electrical pulse, and
      subsequent to phase modulation of the first optical pulse, input a second electrical pulse having a predetermined potential difference relative to the first electrical pulse and phase-modulate the second optical pulse output from the optical pulse output unit according to a voltage of the input second electrical pulse.

2. The phase modulation apparatus of claim 1, wherein the first electrical pulse and the second electrical pulse have opposite polarities.

3. The phase modulation apparatus of claim 2 further comprising:
   an electrical pulse output unit configured to input an electrical pulse and output the input electrical pulse as the first electrical pulse in accordance with a timing in which the first optical pulse is output from the optical pulse output unit, and also to invert a polarity of the input electrical pulse and output the electrical pulse with the inverted polarity as the second electrical pulse, with a time difference corresponding to the predetermined time difference,
   wherein the phase modulation unit applies the first electrical pulse output from the electrical pulse output unit to the first optical pulse output from the optical pulse output unit to phase-modulate the first optical pulse, and applies the second electrical pulse output from the electrical pulse output unit to the second optical pulse output from the optical pulse output unit to phase-modulate the second optical pulse.

4. The phase modulation apparatus of claim 2, wherein the first electrical pulse and the second electrical pulse are a rectangular wave.

5. The phase modulation apparatus of claim 4, wherein the first electrical pulse and the second electrical pulse have a duty of 50%.

6. The phase modulation apparatus of claim 1, wherein the first electrical pulse and the second electrical pulse are a sawtooth wave.

7. A transmitting apparatus comprising:
the phase modulation apparatus of claim 1; and
a transmitting unit configured to transmit the first optical pulse and the second optical pulse phase-modulated by the phase modulation unit of the phase modulation apparatus to a receiving apparatus via an optical path.

8. A receiving apparatus comprising:
a receiving unit configured to receive from the transmitting apparatus of claim 7 via the optical path the first optical pulse and the second optical pulse that are phase-modulated;
a phase modulation unit configured to
  input a first electrical pulse having a predetermined voltage and phase-modulate the first optical pulse received by the receiving unit according to a voltage of the input first electrical pulse, and
  subsequent to phase modulation of the first optical pulse, input a second electrical pulse having a predetermined potential difference relative to the first electrical pulse and phase-modulate the second optical pulse received by the receiving unit according to a voltage of the input second electrical pulse; and
a phase difference detection unit configured to detect a phase difference between the first optical pulse and the second optical pulse phase-modulated by the phase modulation unit.

9. A phase modulation method comprising:
inputting an optical pulse, by an optical pulse output unit;
generating and outputting, by the optical pulse unit and from the input optical pulse, a first optical pulse and a second optical pulse following the first optical pulse with a predetermined time difference;
inputting, by a phase modulation unit, a first electrical pulse having a predetermined voltage;
phase-modulating, by the phase modulation unit, the first optical pulse output from the optical pulse output unit according to a voltage of the input first electrical pulse;
subsequent to phase modulation of the first optical pulse, inputting, by the phase modulation unit, a second electrical pulse having a predetermined potential difference relative to the first electrical pulse; and
subsequent to inputting the second electrical pulse, phase-modulating, by the phase modulation unit, the second optical pulse output from the optical pulse output unit according to a voltage of the input second electrical pulse.

10. The phase modulation method of claim 9, wherein the first electrical pulse and the second electrical pulse have opposite polarities.

11. The phase modulation method of claim 10 further comprising:
inputting an electrical pulse, by an electrical pulse output unit;
outputting, by the electrical pulse output unit, the input electrical pulse as the first electrical pulse in accordance with a timing in which the first optical pulse is output from the optical pulse output unit; and
inverting, by the electrical pulse output unit, a polarity of the input electrical pulse and outputting the electrical pulse with the inverted polarity as the second electrical pulse, with a time difference corresponding to the predetermined time difference,
wherein, by the phase modulation unit, the phase-modulating of the first optical pulse applies the first electrical pulse output from the electrical pulse output unit to the first optical pulse output from the optical pulse output unit to phase-modulate the first optical pulse, and by the phase modulation unit, the phase-modulating of the second optical pulse applies the second electrical pulse output from the electrical pulse output unit to the second optical pulse output from the optical pulse output unit to phase-modulate the second optical pulse.

12. The phase modulation method of claim 10, wherein the first electrical pulse and the second electrical pulse are a rectangular wave.

13. The phase modulation method of claim 12, wherein the first electrical pulse and the second electrical pulse have a duty of 50%.

14. The phase modulation method of claim 9, wherein the first electrical pulse and the second electrical pulse are a sawtooth wave.

15. A phase modulation apparatus comprising:
an optical pulse output unit configured to input an optical pulse, and, from the input optical pulse, generate and output a first optical pulse and a second optical pulse following the first optical pulse with a predetermined time difference;
an electrical pulse output unit configured to input an electrical pulse and output the input electrical pulse as a first electrical pulse in accordance with a timing in which the first optical pulse is output from the optical pulse output unit, and also to invert a polarity of the input electrical pulse and output the electrical pulse with the inverted polarity as a second electrical pulse, with a time difference corresponding to the predetermined time difference; and
a phase modulation unit configured to apply the first electrical pulse output from the electrical pulse output unit to the first optical pulse output from the optical pulse output unit to phase-modulate the first optical pulse, and also to apply the second electrical pulse output from the electrical pulse output unit to the second optical pulse output from the optical pulse output unit to phase-modulate the second optical pulse.

16. A phase modulation method comprising:
inputting an optical pulse, by an optical pulse output unit;
generating and outputting, by the optical pulse output unit and from the input optical pulse, a first optical pulse and a second optical pulse following the first optical pulse with a predetermined time difference;
inputting an electrical pulse, by an electrical pulse output unit;
outputting, by the electrical pulse output unit, the input electrical pulse as a first electrical pulse in accordance with a timing in which the first optical pulse is output from the optical pulse output unit;
inverting, by the electrical pulse output unit, a polarity of the input electrical pulse and outputting the electrical pulse with the inverted polarity as a second electrical pulse, with a time difference corresponding to the predetermined time difference;
applying, by a phase modulation unit, the first electrical pulse output from the electrical pulse output unit to the first optical pulse output from the optical pulse output unit to phase-modulate the first optical pulse;
applying, by the phase modulation unit, the second electrical pulse output from the electrical pulse output unit to the second optical pulse output from the optical pulse output unit to phase-modulate the second optical pulse.

17. A phase modulation apparatus comprising:
an optical pulse output unit configured to input an optical pulse, and, from the input optical pulse, generate and output a first optical pulse and a second optical pulse following the first optical pulse with a predetermined time difference; and a phase modulation unit configured to input a first electrical pulse having a predetermined voltage and phase-modulate the first optical pulse output from the optical pulse output unit according to a voltage of the input first electrical pulse, and also to input a second electrical pulse having an opposite polarity and a same amplitude relative to the first electrical pulse and phase-modulate the second optical pulse output from the optical pulse output unit according to a voltage of the input second electrical pulse.

18. The phase modulation apparatus of claim 17 further comprising:

an electrical pulse output unit configured to input an electrical pulse and output the input electrical pulse as the first electrical pulse in accordance with a timing in which the first optical pulse is output from the optical pulse output unit, and also to invert a polarity of the input electrical pulse and output the electrical pulse with the inverted polarity as the second electrical pulse, with a time difference corresponding to the predetermined time difference, wherein the phase modulation unit applies the first electrical pulse output from the electrical pulse output unit to the first optical pulse output from the optical pulse output unit to phase-modulate the first optical pulse, and applies the second electrical pulse output from the electrical pulse output unit to the second optical pulse output from the optical pulse output unit to phase-modulate the second optical pulse.

19. The phase modulation apparatus of claim 17, wherein the first electrical pulse and the second electrical pulse are a rectangular wave.

20. The phase modulation apparatus of claim 19, wherein the first electrical pulse and the second electrical pulse have a duty of 50%.

21. The phase modulation apparatus of claim 17, wherein the first electrical pulse and the second electrical pulse are a sawtooth wave.

22. A transmitting apparatus comprising:
the phase modulation apparatus of claim 17; and
a transmitting unit configured to transmit the first optical pulse and the second optical pulse phase-modulated by the phase modulation unit of the phase modulation apparatus to a receiving apparatus via an optical path.

23. A receiving apparatus comprising:
a receiving unit configured to receive from the transmitting apparatus of claim 22 via the optical path the first optical pulse and the second optical pulse that are phase-modulated;
a phase modulation unit configured to input a first electrical pulse having a predetermined voltage and phase-modulate the first optical pulse received by the receiving unit according to a voltage of the input first electrical pulse, and also to input a second electrical pulse having an opposite polarity and a same amplitude relative to the first electrical pulse and phase-modulate the second optical pulse received by the receiving unit according to a voltage of the input second electrical pulse; and a phase difference detection unit configured to detect a phase difference between the first optical pulse and the second optical pulse phase-modulated by the phase modulation unit.

24. A phase modulation method comprising:
inputting an optical pulse, by an optical pulse output unit;
generating and outputting, by the optical pulse output unit and from the input optical pulse, a first optical pulse and a second optical pulse following the first optical pulse with a predetermined time difference;
inputting, by a phase modulation unit, a first electrical pulse having a predetermined voltage;
phase-modulating, by the phase modulation unit, the first optical pulse output from the optical pulse output unit according to a voltage of the input first electrical pulse;
inputting, by the phase modulation unit, a second electrical pulse having an opposite polarity and a same amplitude relative to the first electrical pulse; and
phase-modulating, by the phase modulation unit, the second optical pulse output from the optical pulse output unit according to a voltage of the input second electrical pulse.

25. The phase modulation method of claim 24 further comprising:
inputting an electrical pulse, by an electrical pulse output unit;
outputting, by the electrical pulse output unit, the input electrical pulse as the first electrical pulse in accordance with a timing in which the first optical pulse is output from the optical pulse output unit; and
inverting, by the electrical pulse output unit, a polarity of the input electrical pulse and outputting the electrical pulse with the inverted polarity as the second electrical pulse, with a time difference corresponding to the predetermined time difference,
wherein, by the phase modulation unit, the phase-modulating of the first optical pulse applies the first electrical pulse output from the electrical pulse output unit to the first optical pulse output from the optical pulse output unit to phase-modulate the first optical pulse, and
by the phase modulation unit, the phase-modulating of the second optical pulse applies the second electrical pulse output from the electrical pulse output unit to the second optical pulse output from the optical pulse output unit to phase-modulate the second optical pulse.

26. The phase modulation method of claim 24, wherein the first electrical pulse and the second electrical pulse are a rectangular wave.

27. The phase modulation method of claim 26, wherein the first electrical pulse and the second electrical pulse have a duty of 50%.

28. The phase modulation method of claim 24, wherein the first electrical pulse and the second electrical pulse are a sawtooth wave.

* * * * *